United States Patent
Yuasa (10) Patent No.: US 7,075,540 B2
(45) Date of Patent: Jul. 11, 2006

(54) INFORMATION DISPLAY DEVICE AND SYSTEM DISPLAYING A PLURALITY OF INFORMATION INDEPENDENTLY

(75) Inventor: Natsuki Yuasa, Yachiyo (JP)

(73) Assignee: Sharp Kabushiki Kaisha, Osaka (JP)

( * ) Notice: Subject to any disclaimer, the term of this patent is extended or adjusted under 35 U.S.C. 154(b) by 26 days.

(21) Appl. No.: 09/785,308

(22) Filed: Feb. 20, 2001

(65) Prior Publication Data

US 2001/0019326 A1    Sep. 6, 2001

(30) Foreign Application Priority Data

Feb. 21, 2000    (JP)    ............................. 2000-042417

(51) Int. Cl.
*G06F 15/16* (2006.01)

(52) U.S. Cl. ......................... 345/502; 345/1.1; 345/100

(58) Field of Classification Search ................. 345/1.1, 345/10, 501, 502, 507, 2.1, 3.1, 2, 97, 100; 348/468
See application file for complete search history.

(56) References Cited

U.S. PATENT DOCUMENTS

| | | | | |
|---|---|---|---|---|
| 5,241,657 A | * | 8/1993 | Fine et al. | ................... 345/501 |
| 5,307,055 A | * | 4/1994 | Baskin et al. | ................. 345/2.2 |
| 5,384,576 A | * | 1/1995 | Tashiro et al. | ................. 345/3.1 |
| 5,384,579 A | * | 1/1995 | Nakasuji et al. | ............. 345/684 |
| 5,559,548 A | * | 9/1996 | Davis et al. | ................... 725/40 |
| 5,576,768 A | * | 11/1996 | Gomikawa | ................... 348/468 |
| 5,719,761 A | * | 2/1998 | Gatti et al. | ...................... 700/1 |
| 5,754,501 A | * | 5/1998 | Tsutsui | ................... 369/124.01 |
| 5,774,105 A | * | 6/1998 | Yamamoto et al. | ............ 345/97 |
| 5,946,046 A | * | 8/1999 | You et al. | .................... 348/468 |
| 5,999,088 A | * | 12/1999 | Sibbitt | ........................ 340/7.55 |
| 6,002,450 A | * | 12/1999 | Darbee et al. | ............. 348/734 |
| 6,082,500 A | * | 7/2000 | Amo et al. | .................. 187/391 |
| 6,177,931 B1 | * | 1/2001 | Alexander et al. | ............. 725/52 |
| 6,191,758 B1 | * | 2/2001 | Lee | ............... 345/2 |
| 6,222,520 B1 | * | 4/2001 | Gerszberg et al. | .......... 345/113 |
| 6,250,428 B1 | * | 6/2001 | Amo et al. | .................. 187/391 |
| 6,271,814 B1 | * | 8/2001 | Kaoh | ........................... 345/82 |
| 6,348,904 B1 | * | 2/2002 | Arai et al. | ..................... 345/10 |
| 6,496,122 B1 | * | 12/2002 | Sampsell | ............... 340/825.69 |
| 6,637,029 B1 | * | 10/2003 | Maissel et al. | |
| 6,661,425 B1 | * | 12/2003 | Hiroaki | ...................... 345/629 |

FOREIGN PATENT DOCUMENTS

| | | |
|---|---|---|
| JP | 61-191681 U | 11/1986 |
| JP | 06-007373 U | 1/1994 |
| JP | 06-178221 A | 6/1994 |
| JP | A818521 | 1/1996 |
| JP | 08-046888 A | 2/1996 |
| JP | 2001100702 A * | 9/1999 |
| JP | 11-317885 | 11/1999 |
| WO | WO 98/43158 A1 | 10/1998 |

* cited by examiner

*Primary Examiner*—Albert Decady
*Assistant Examiner*—Fritz Alphonse
(74) *Attorney, Agent, or Firm*—Birch, Stewart, Kolasch & Birch, LLP (57) ABSTRACT

In order to simultaneously and effectively display main information and advertisement information, there is provided an information display device including an information receiver receiving information having at least first and second information, an information controller extracting the first and second information from the information received, a first-information display unit displaying the fist information extracted, and a second-information display unit displaying the second information extracted.

21 Claims, 6 Drawing Sheets

INFORMATION DISPLAY DEVICE AND SYSTEM DISPLAYING A PLURALITY OF INFORMATION INDEPENDENTLY

BACKGROUND OF THE INVENTION

1. Field of the Invention

The present invention relates to information display devices and systems receiving and displaying information transmitted through ground-based broadcasting, satellite broadcasting, CATV nets, the Internet and other similar transmission lines, particularly information including advertisement data.

2. Description of the Background Art

Japanese Patent Laying-Open No. 8-18521 discloses a data display device displaying information transmitted on a transmission line including advertisement data. The data display device receives and records transmitted data including newspaper data and advertisement data, and reads the newspaper data via a display means and thereafter, when a predetermined period of time has elapsed, allows the display means to display the advertisement data.

Furthermore in recent years an advertisement distributed via the Internet can be displayed to a user in the form of a banner on a web page displayed on a display for example of a personal computer or it can also be displayed in the form of a banner in a frame of a plurality of frames obtained by partitioning a screen of a web page, for exclusively displaying the advertisement.

The data display device disclosed in Japanese Patent Laying-Open No. 8-18521 is useful for clients as it can display an advertisement to users at predetermined intervals. However, when an advertisement is being displayed the displayed advertisement overlaps and the user cannot read newspaper data or the like. Thus the data display device is not convenient for users. Furthermore, if a user has finished reading newspaper data in a short period of time then the user would stop seeing the screen before any advertisement data is displayed.

If an advertisement displayed on a web page provided via the Internet is displayed in a frame exclusively displaying advertisements it can be displayed independently of a frame displaying a main screen. Thus, the displayed advertisement screen does not overlap the displayed main screen and the user can thus read the information on the main screen without any interference of the advertisement. While advertisements can thus be conveniently displayed, if the user jumps to a web page of a different address then the advertisement would disadvantageously disappear. Furthermore, a displayed main screen and a displayed advertisement screen are partitioned simply by a frame displayed on the same display screen and they are not partitioned physically. Thus, it is impossible to display an advertisement with higher level of definition than a main screen and display only one of a main screen and an advertisement.

SUMMARY OF THE INVENTION

The present invention has been made to overcome the disadvantages set forth above. One object of the present invention is to provide an information display device and system capable of displaying a plurality of different information independently.

The present invention in one aspect provides an information display device including: an information receiver receiving information including at least first information and second information; an information controller extracting the first and second information from the information received; a first-information display unit displaying the first information extracted; and a second-information display unit displaying the second information extracted.

Furthermore, the present invention provides an information display device including: an information receiver receiving information including at least first information and second information; an information controller extracting the first and second information from the information received; a first-information display unit displaying the first information extracted; a second-information storage successively storing the second information extracted; and a plurality of second-information display units successively displaying the second information stored.

In accordance with the present invention, there can be provided an information display device capable of displaying a plurality of information independently.

Furthermore the present invention provides an information display device characterized in that the first information is information that can be selected by a user for the user to see and hear and that the second information is compulsorily provided to an information receiving side by an information transmitting side. The compulsorily displayed information is for example advertisement information and the information transmitting side can thus achieve effective advertising.

Furthermore the present invention provides an information display device characterized in that the first-information display unit and the second-information display unit are different display devices. For example if the first-information display unit is a liquid crystal display and the second-information display unit is a non-volatile display device continuing to display information even with power supply turned off, thus while the first information is not displayed the second information can still be displayed even with the present information display device powered off. Furthermore if the second information is advertisement information then an advertisement can be continuously displayed. As such, an information transmitting side can provide an advertisement with an enhanced effect and an information receiving side can also have his/her favorite advertisement continuously displayed.

Furthermore the present invention provides an information display system including a first-information display device displaying first information and a second-information display device displaying second information. The first-information display device includes an information receiver receiving information having at least first information and second information, an information controller extracting the first and second information from the information received, a first-information display unit displaying the first information extracted, and a second-information transmitter transmitting the second information extracted. The second-information display device includes a second-information receiver receiving the second information transmitted from the second-information transmitter, and a second-information display unit displaying the second information.

In the present information display system more than one second-information display unit as described above may be used. Furthermore the second information may be information forced to be provided to a receiving side. Furthermore the information forced to be provided may be advertisement information. Furthermore the second-information display unit can be a display device continuing to display information even with the power supply turned off. Furthermore the first- and second-information display units may be different devices.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The embodiments of the present information display device will now be described with reference to the drawings.

First Embodiment

Figure 1:
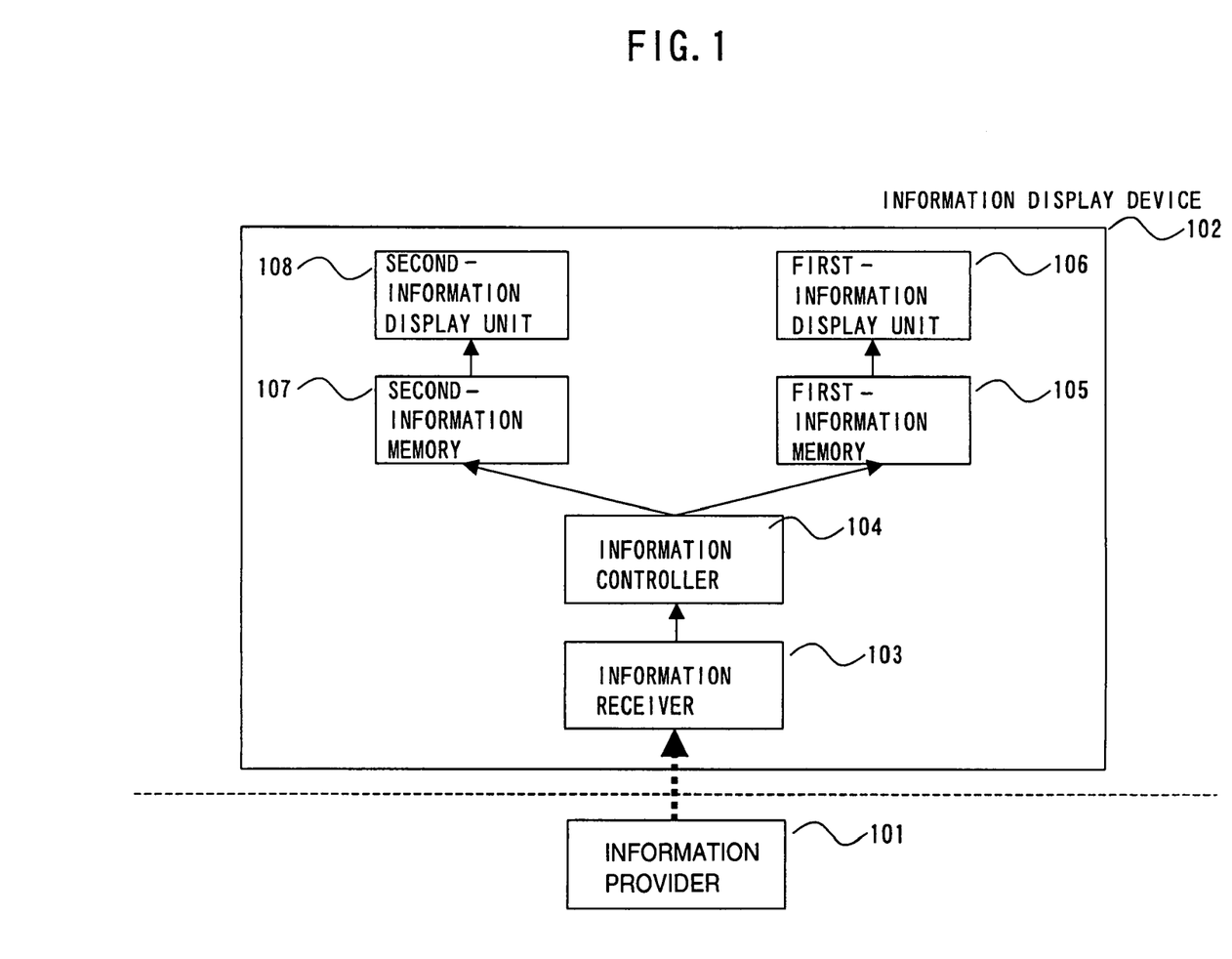
FIG. 1 shows a configuration of an information display device in a first embodiment of the present invention.

FIG. 1 shows a configuration of an information display device in the present embodiment. An information display device 102 includes an information receiver 103, an information controller 104, a first-information memory 105, a first-information display unit 106, a second-information memory 107 and a second-information display unit 108.

Initially, reference will be made to FIG. 1 to describe how data transmitted from an information provider 101 and received by information display device 102 flows therethrough before the data is displayed thereby.

Information receiver 103 receives data formed of two types of data, first-information data and second-information data transmitted from information provider 101.

Information controller 104 separates the data received by information receiver 103 into the first-information data and the second-information data and sorts the first- and second-information data out for the first- and second-information memories 105 and 107, respectively.

The first- and second-information memories 105 and 107 store the first- and second-information data, respectively, sorted out by information controller 104.

The first- and second-information display units 106 and 108 display the first- and second-information data, respectively, stored in the first- and second-information memories 105 and 107, respectively.

Information provider 101 and the first- and second-information data will now be described more specifically by way of example.

Information provider 101 is a transmission device of a TV broadcaster transmitting data formed of TV program data (the first-information data) and advertisement data (the second-information data). In this context, TV program data refers to data provided to display a TV program such as a news program and advertisement data refers to data provided to display an advertisement requested by a client such as a sponsor to be displayed. Information display device 102 is a device capable of receiving TV broadcasting, receiving and displaying the data set forth above.

The second information may be information accompanying the first information whenever the first information is transmitted.

Information receiver 103 receives the data set forth above, and information controller 104 sorts each information out and controls the first- and second-information memories 105 and 107 to store TV program data and advertisement data, respectively, and the first- and second-information display units 106 and 108 to display the TV program and the advertisement, respectively.

Figure 3:
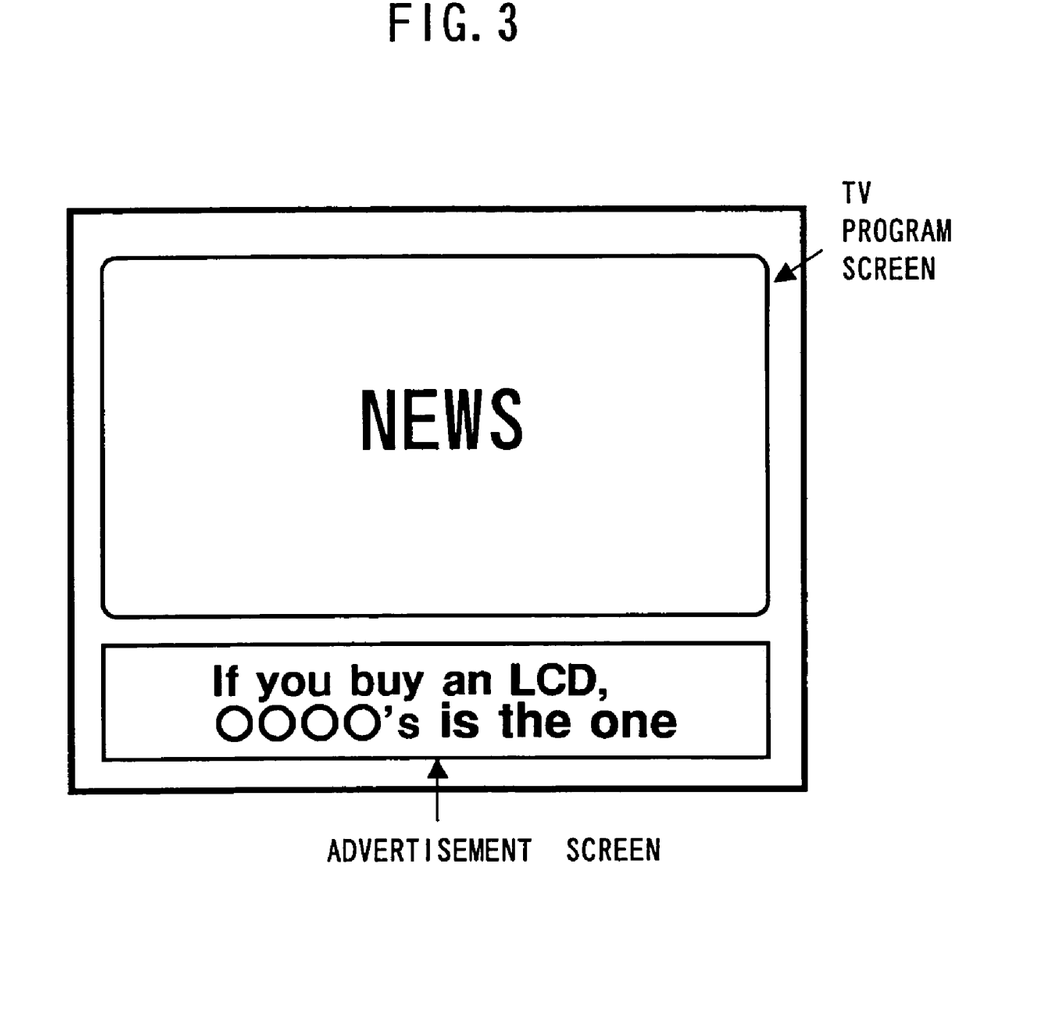
FIG. 3 represents an example of displaying received information when the information display device of the first embodiment is a television set.

With reference to FIG. 3, information display device 102 is by way of example a television set, as has been described above, receiving and displaying a TV program and an advertisement, with a screen physically divided in two to provide first- and second-information display units 106 and 108. The first-information display unit 106, provided to display a TV program, displays "news at seven o'clock" and the second-information display unit 108, provided to display an advertisement, displays "If you buy an LCD . . . 's is the one." In this example, information receiver 103, the first-information memory 105 and the first-information display unit 106 can be components already existing in the TV set. Thus, if the information display device 102 can be manufactured by additionally providing an existing TV set with information controller 104, the second-information memory 107 and the second-information display unit 108 and arranging the first-information display unit 106 in the TV set adjacent to the second-information display unit 108 to reduce the cost for manufacturing the same.

While in the above example the second information corresponds to an advertisement requested by a sponsor to be displayed, it is not limited thereto and it may for example be existing data such as teletext broadcasting and displayed on the second-information display unit.

Another specific example of information provider 101 and the first- and second-information data will now be described.

Information provider 101 is a television set and information display device 102 is a multifunctional remote controller adapted to communicate data bidirectionally with TV sets, video recorders/players, air conditioners or other similar household electrical goods to serve as any one of a remote controller for a TV, that for a video recorder/player and that for an air conditioner. In this example, the first-information data, transmitted from the TV to the multifunction remote controller, is data indicating a channel number of a TV broadcasting currently received by the TV and the second-information data corresponds to advertisement data. The advertisement data is transmitted for example via a TV broadcasting station, a telephone line, RS232C, infrared ray, electronic wave, an IC card, a mobile terminal and the like, and thus externally input to the TV. If a telephone line, RS232C, infrared ray, electronic wave, an IC card, a mobile terminal or the like is used, the TV is required to have a separate receiver therefor, although they are well known techniques and can thus be readily implemented.

Figure 4:
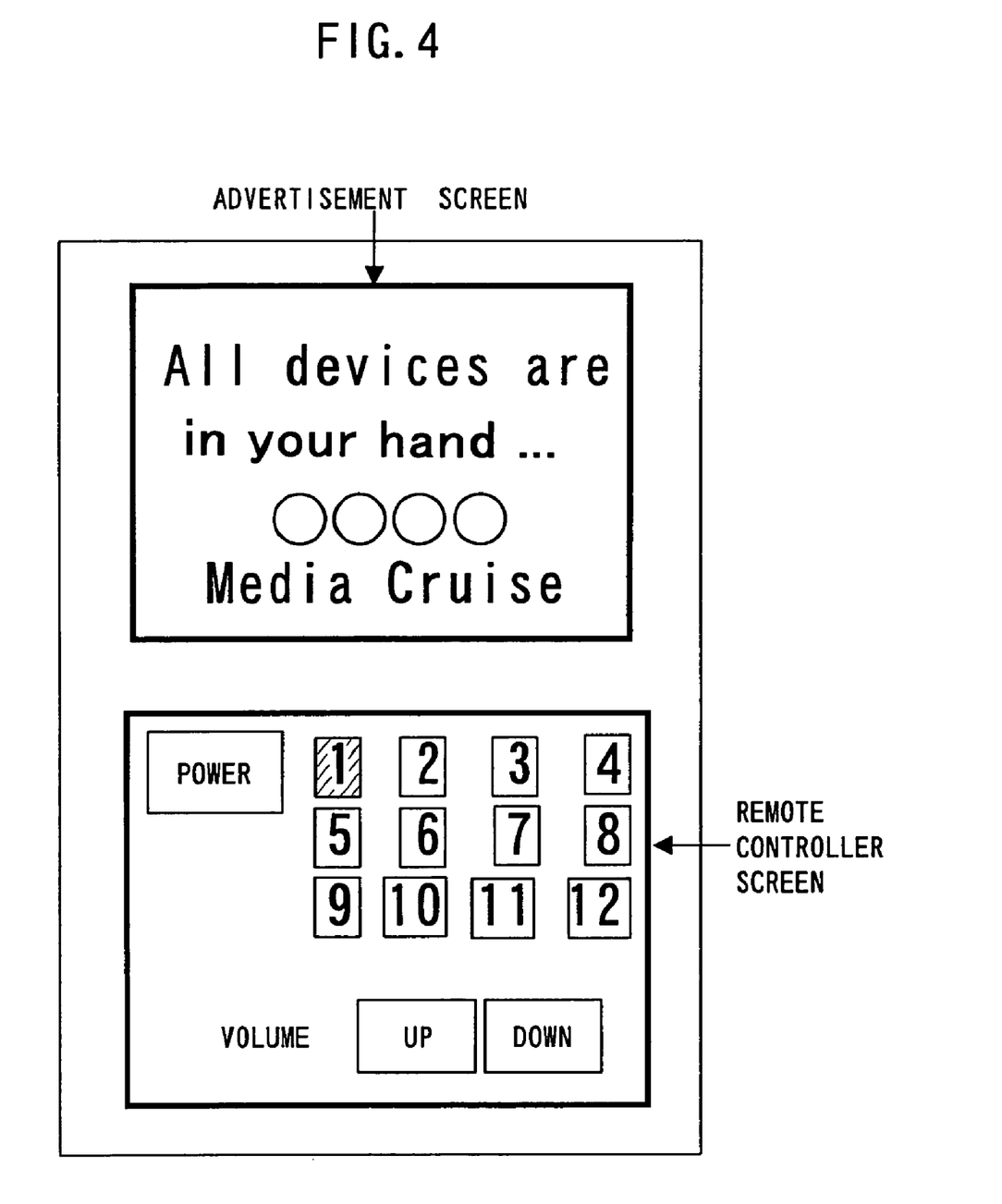
FIG. 4 represents an example of displaying received information when the information display device of the first embodiment is a multifunctional remote controller.

With reference to FIG. 4, information display device 102 is by way of example a multifunctional remote controller, as has been described above, receiving and displaying a channel number and an advertisement. The first-information display unit 106, provided to display a channel number, displays a highlighted, currently received channel number "1" (in FIG. 4 the channel number is hatched, rather than highlighted, for the sake of convenience) and the second-information display unit 108, provided to display an advertisement, displays "All devices are in your hand . . . ○○○○Media Cruise."

Second Embodiment

The second embodiment is distinguished from the first embodiment in that a display unit displaying the first information and that displaying the second information do not exist in a single casing.

Figure 2:
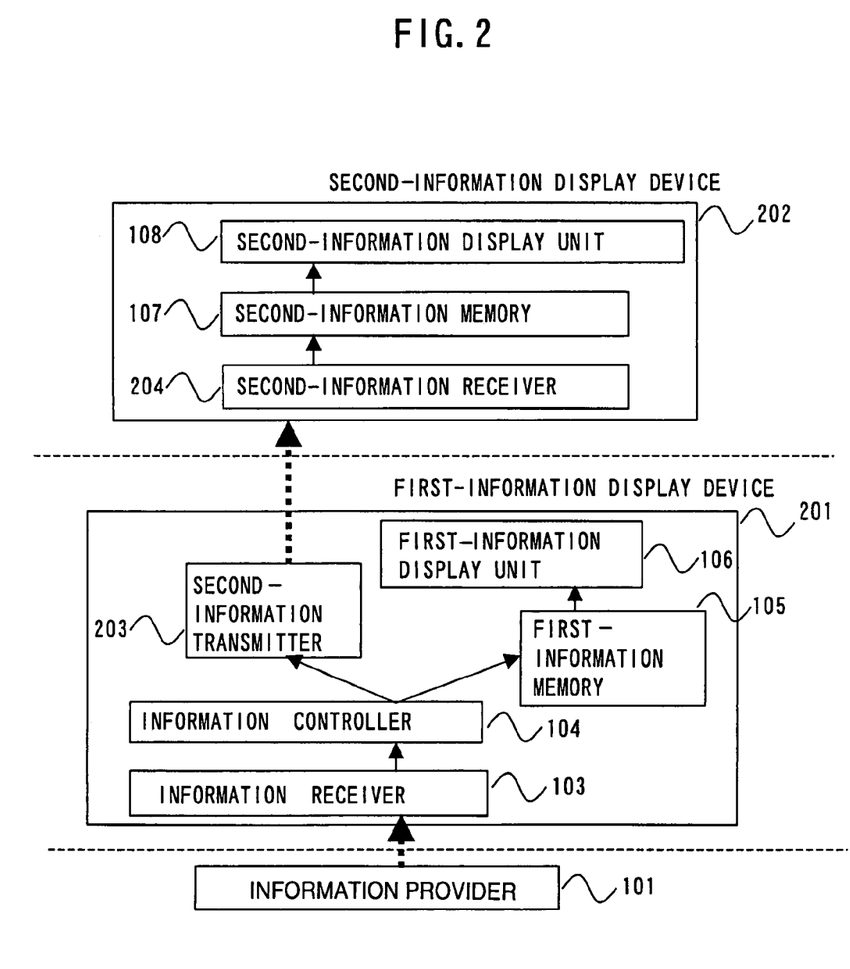
FIG. 2 shows a configuration of an information display system in a second embodiment of the present invention.

FIG. 2 shows a configuration of an information display system of the present embodiment. The information display system includes a first-information display device 201 and a second-information display device 202. The first-information display device 201 includes an information receiver 103, an information controller 104, a first-information memory 105, a first-information display unit 106 and a second-information transmitter 203. The second-information display device 202 includes a second-information receiver 204, a second-information memory 107 and a second-information display unit 108.

Initially reference will be made to FIG. 2 to describe how data transmitted from information provider 101 and received by the information display system flows therethrough before the data is displayed.

Information receiver 103 receives data formed of two types of data transmitted from information provider 101, i.e., first-information data and second-information data.

Information controller 104 separates the data received by information receiver 103 into the first- and second-information data and sorts the first- and second-information data out for the first- and second-information memories 105 and 203, respectively.

The first-information memory 105 stores the first-information data sorted by information controller 104 and the first-information display unit 106 displays the first-information data stored in the first-information memory 105.

The second-information transmitter 203 transmits the second-information data sorted by information controller 104, to the second-information display device 202 by wireless such as via an infrared ray.

The second-information receiver 204 receives the second-information data transmitted from the second-information transmitter 203.

The second-information memory 107 stores the second-information data received by the second-information receiver 205 and the second-information display unit 108 displays the second-information data stored in the second-information memory 107.

Information provider 101, the first- and second-information display devices 201 and 202 and the first- and second-information data will now be described more specifically by way of example.

Information provider 101 is a transmission device of a TV broadcasting station, as described in the first embodiment, transmitting data formed of TV program data (the first-information data) and advertisement data (the second-information data). The first-information display device 201 is a television set capable of receiving the TV program data and the second-information display device 202 is a TV remote controller capable of receiving the advertisement data.

Information receiver 103 receives the data described above, and information controller 104 sorts the TV program data and the advertisement data out for the first-information memory 105 and the second-information transmitter 203, respectively. The TV program sorted for the first-information memory 105 is displayed on the first-information display unit 106. The advertisement data sorted for the second-information transmitter 203 is transmitted to the second-information receiver 204, stored in the second-information memory 107 and displayed on the second-information display unit 108.

The present embodiment thus configured can display a TV program via a television set as well as an advertisement on a display unit of a TV remote controller.

Figure 5:
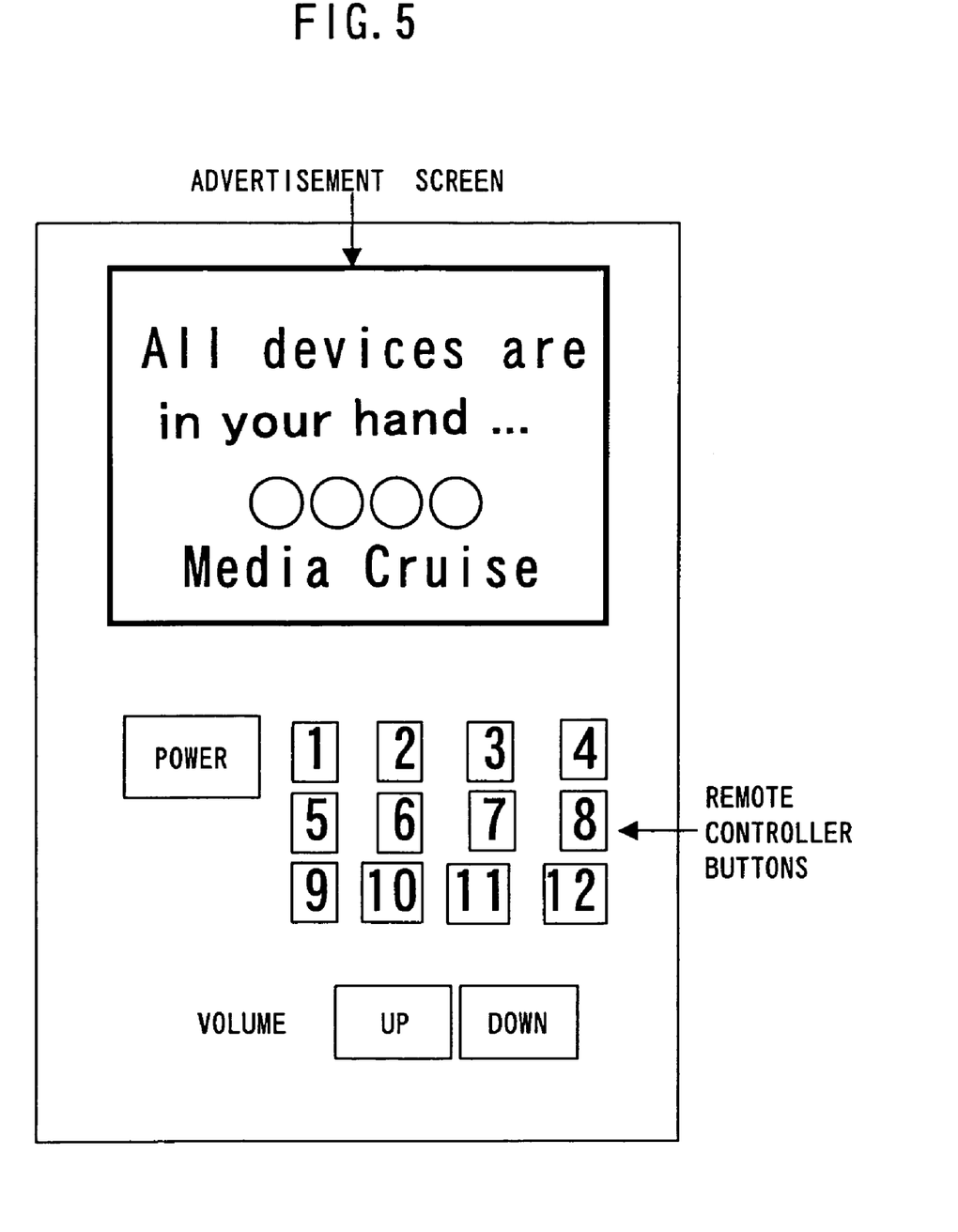
FIG. 5 shows an example of displaying received information when the information display device of the second embodiment is a TV remote controller.

With reference to FIG. 5, by way of example the first-information display device 201 is a TV set and the second-information display device 203 is a TV remote controller, as has been described above, receiving and displaying a TV program and an advertisement. The TV remote controller displays on its display unit an advertisement "All devices are in your hand ○○○○ Media Cruise."

While the first and second embodiments employ two pairs of an information display unit and an information memory, the present invention is not limited thereto and it may employ more than two pairs of an information display unit and an information memory. In such an implementation, information provider 101 transmits more than two types of information, which are in turn sorted out by information controller 104 and thus displayed on their respective display units.

Furthermore, while the first and second embodiments exemplary employ a single pair of the second-information memory 107 and the second-information display unit 108, the present invention is not limited thereto and it may employ more than one pair of the second-information memory 107 and the second-information display unit 108. In such an implementation, the plurality of the second-information memories 107 store the histories of the previously transmitted second information one by one in chronological order and the second-information display unit 108 corresponding to the second-information memory 107 displays its respective second information.

Figure 6:
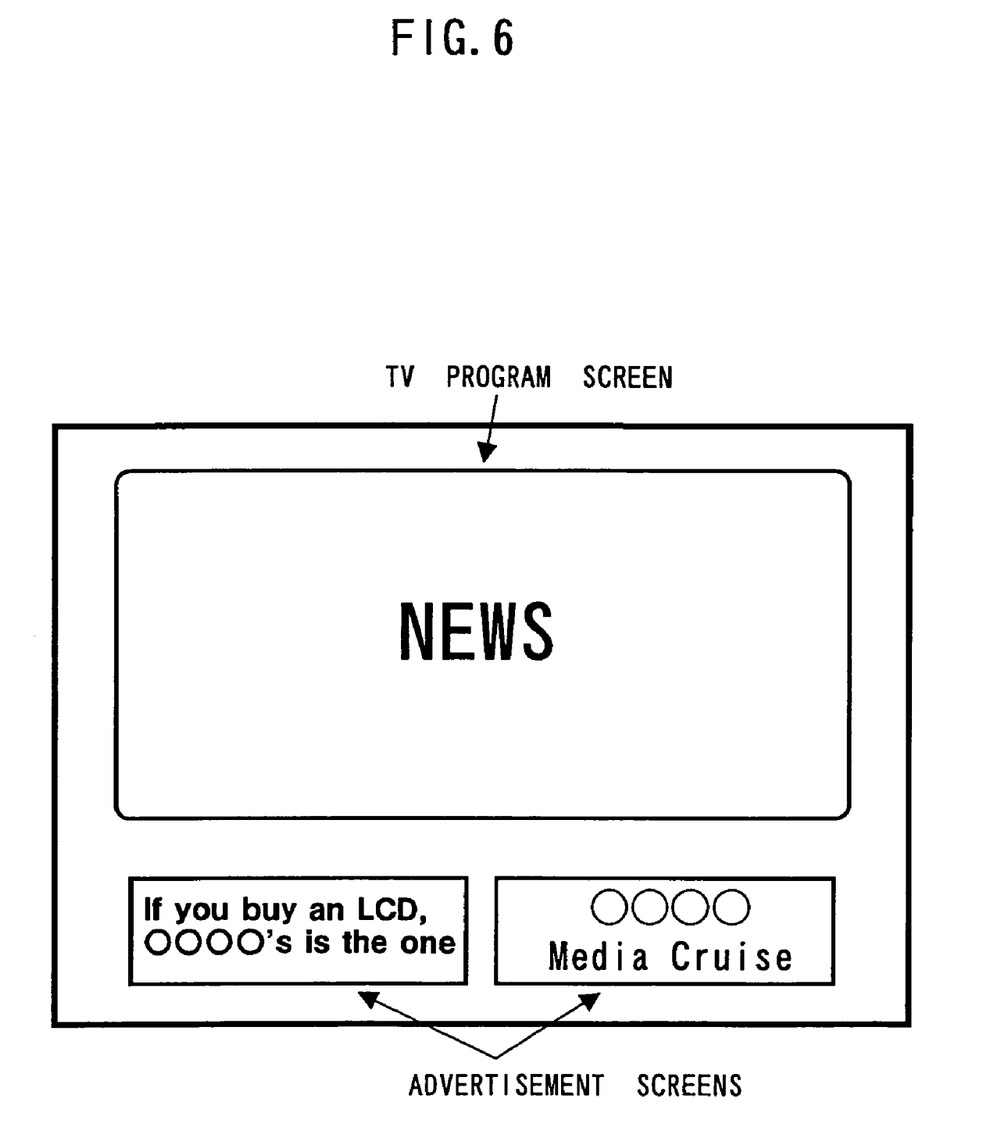
FIG. 6 shows an example of displaying received information when the information display device of the second embodiment is a TV having three displaying portions.

FIG. 6 shows by way of example information display device 102 in the form of a TV, with two pairs of the second-information memory 107 and the second-information display unit 108. FIG. 6 shows an example when the second information previously transmitted is "If you buy an LCD ○○○○'s is the one," and the second information last transmitted is "○○○○ . . . Media Cruise." Subsequently when new second information is transmitted, on the left hand display unit "If you buy an LCD ○○○○'s is the one" disappears and "○○○○ . . . Media Cruise " is displayed and on the right-hand display unit the second information subsequently transmitted is displayed.

While the first and second embodiments employ a TV program and an advertisement as the first-information data and the second-information data, respectively, by way of example, the present invention is not limited thereto and the first-information data may be data indicating a web page provided via the Internet and the second-information data may be character data indicating letters superimposed on a movie film, character data indicating a translation of a bilingual broadcasting, or data further describing the first-information data.

In the first and second embodiments the second-information display unit 108 displays advertisements exclusively. As such, if it is a non-volatile display device formed for example of ferroelectric liquid crystal then it can continue to display an advertisement with information display device 102 powered off. For example, if a favorite advertisement is received, using a display setting means (not shown) to provide a setting to continuously display the advertisement on the second-information display unit 108 allows the user to continue to display the favorite image and also allows the client to have the advertisement displayed for a long period of time to enhance its advertising effect.

Furthermore, the first- and second-information display units 106 and 108 can each be provided with a power switch for switching them on/off, to set only one of them to display information and thus save power otherwise wastefully consumed.

Since the first- and second-information display units 106 and 108 are separate from each other, the former or the latter can be adapted to be a display device enhanced in resolution. For example, of the two display units the second-information display unit 108 having a reduced size for displaying information may be a display device enhanced in resolution. Thus it can display advertisement with high definition and the present device and system can thus be convenient for both of clients and users. Furthermore the first-information display unit 106 having an increased size for displaying information is not required to be a display device enhanced in resolution and its fabrication cost can thus be reduced.

As has been described, the present invention can provide a TV, a remote controller terminal and the like with a display unit provided separately, independently of a display unit displaying main information, to display an advertisement and the like on the independent display unit. Since the advertisement can be displayed on a display unit exclusively displaying advertisements, the advertisement can be displayed without interfering information that the user wants to obtain. Furthermore, the display unit exclusively displaying advertisements that has high quality can display information with high quality. Furthermore, the display unit exclusively displaying advertisements that is a non-volatile display unit can continue to display an advertisement if a TV or a remote controller is powered off.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information display device comprising:
   an information receiver receiving information including at least first information and second information;
   an information controller extracting said first and second information from said information received;
   a first-information display unit displaying said first information extracted; and
   a second-information display unit displaying said second information extracted; wherein
   said second information is advertisement information.

2. The information display device of claim 1, wherein said second information is compulsorily provided to an information receiving side by an information transmitting side.

3. The information display device of claim 1, wherein said second-information display unit is a display device continuing to display information even when the information display device is powered off.

4. The information display device of claim 1, wherein said first-information display unit and said second-information display unit are separate from each other.

5. The information display device of claim 1, wherein the information receiver receives a third information, which is extracted from the first and second information and displayed on a third display.

6. The information display device of claim 1, wherein the first information is independent of the second information.

7. An information display device comprising:
   an information receiver receiving information including at least first information and second information;
   an information controller extracting said first and second information from said information received;
   a first-informaton display unit displaying said first information extracted;
   an information storage successively storing said second information extracted; and
   a second-information display unit successively displaying said second information stored.

8. The information display device of claim 7, wherein said second information is compulsorily provided to an information receiving side by an information transmitting side.

9. The information display device of claim 8, wherein said information compulsorily provided is advertisement information.

10. The information display device of claim 7, wherein said second-information display unit Is a display device continuing to display information even when the information display device is powered off.

11. The information display device of claim 7, wherein said first-information display unit and said second-information display unit are separate from each other.

12. The information display device of claim 7, wherein the information receiver receives a third information, which is extracted from the first and second information and displayed on a third display.

13. The information display device of claim 7, wherein said information receiver receives said first information and said second information through different communication paths, respectively.

14. The information display device of claim 7, wherein there exist more than one said second-information display unit.

15. The information display device of claim 7, wherein the first information is independent of the second information.

16. An information display system comprising a first-information display device displaying first information and a second-information display device displaying second information, said first-information display device including:
   an information receiver receiving information having at least first information and second information;
   an information controller extracting said first and second information from said information received;
   a first-information display unit displaying said first information extracted; and
   a second-information transmitter transmitting said second information extracted, said second-information display device including:
   a second information receiver receiving said second information transmitted from said second-information transmitter; and
   a second-information display unit displaying said second information, wherein
   said second information is advertisement information.

17. The information display system of claim 16, wherein said second information is compulsorily provided to an information receiving side by an information transmitting side.

18. The information display system of claim 16, wherein said second-information display unit is a display device continuing to display information even when the information display device is powered off.

19. The information display system of claim 16, wherein the information receiver receives a third information, which is extracted from the first and second information and displayed on a third display.

20. The information display system of claim 16, wherein the first information is independent of the second information.

21. An information display device comprising;
   an information receiver receiving information including at least first information and second information;
   an information controller extracting said first and second information from said information received;
   a first-information display unit displaying said first informaton extracted; and
   a second-information display unit displaying said second information extracted, wherein the information display device is a remote controller.

* * * * *